United States Patent
Ayres

[11] 3,919,085
[45] Nov. 11, 1975

[54] PLASMA SEPARATOR ASSEMBLY

[75] Inventor: Waldemar A. Ayres, Rutherford, N.J.

[73] Assignee: Becton, Dickinson and Company, N.J.

[22] Filed: Feb. 27, 1974

[21] Appl. No.: 446,380

[52] U.S. Cl. ............ 210/83; 210/516; 210/DIG. 23
[51] Int. Cl.² ......................................... B01D 21/26
[58] Field of Search ....... 23/230 B, 258.5, 259, 292, 23/253; 128/214 R, 272; 210/83, 84, 109, 131, 359, 514–518, DIG. 23, DIG. 24; 233/1 A, 1 R, 26

[56] References Cited
UNITED STATES PATENTS

| | | | |
|---|---|---|---|
| 3,437,266 | 4/1969 | Patterson | 210/DIG. 23 |
| 3,508,653 | 4/1970 | Coleman | 210/DIG. 23 |
| 3,647,070 | 5/1972 | Adler | 210/83 |
| 3,780,935 | 12/1973 | Lukacs et al. | 210/DIG. 23 |
| 3,786,985 | 1/1974 | Blaivas | 233/26 |

Primary Examiner—Samih N. Zaharna
Assistant Examiner—Robert H. Spitzer
Attorney, Agent, or Firm—Kane, Dalsimer, Kane, Sullivan and Kurucz

[57] ABSTRACT

A blood collection and separator assembly of the type suitable for centrifuging to separate the plasma or serum for the cellular phase of blood is disclosed. The assembly includes a collection container and a distorted spherical barrier disposed therein for sealing off the plasma or serum phase from the cellular or heavy phase of blood after centrifuging is terminated. The barrier is formed having a specific gravity heavier than the serum/plasma phase of the blood but lighter than its cellular or heavy phase. The barrier is made of an elastomeric material having means for retaining the barrier in a deformed condition prior to separating the blood collected in the assembly; and the deformable means being capable of returning the barrier toward its normal configuration to seal the barrier in the container at the plasma/serum-cellular interface after centrifuging is terminated.

5 Claims, 6 Drawing Figures

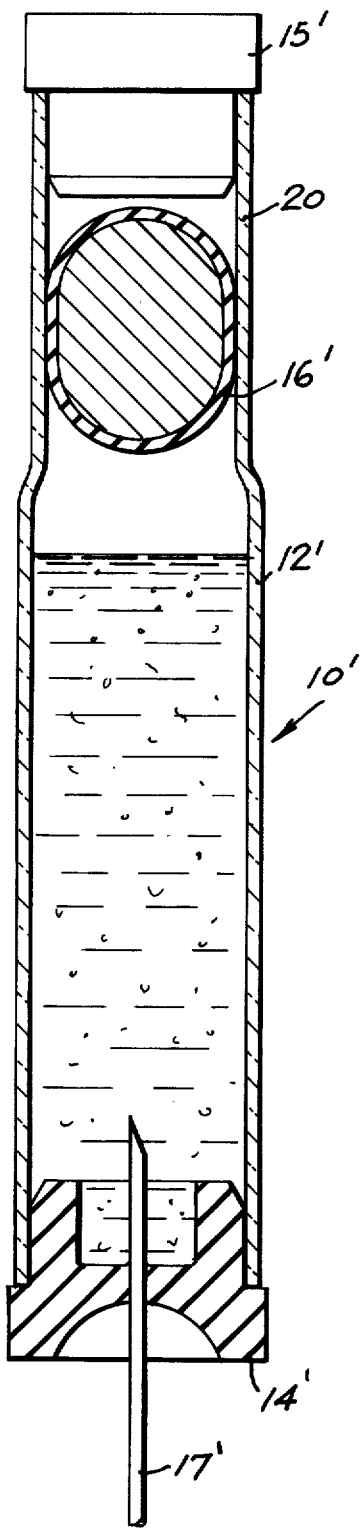
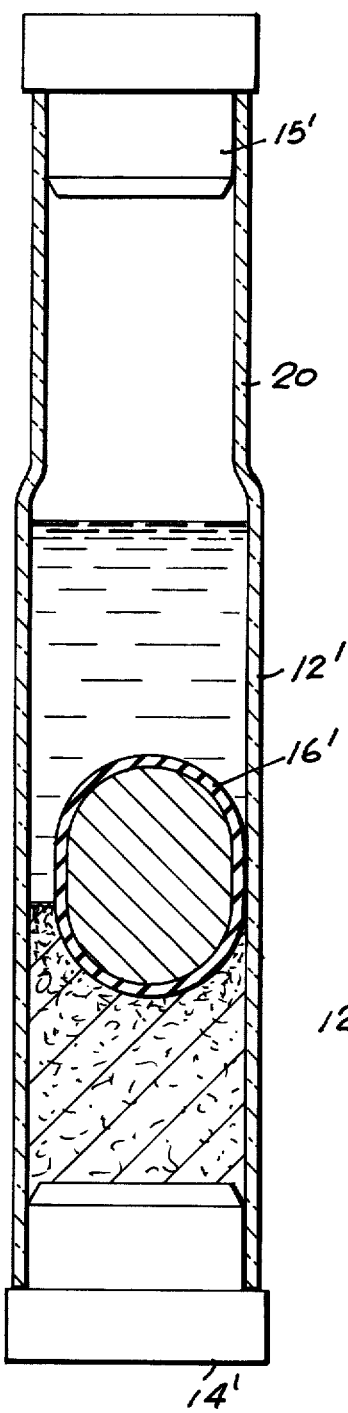
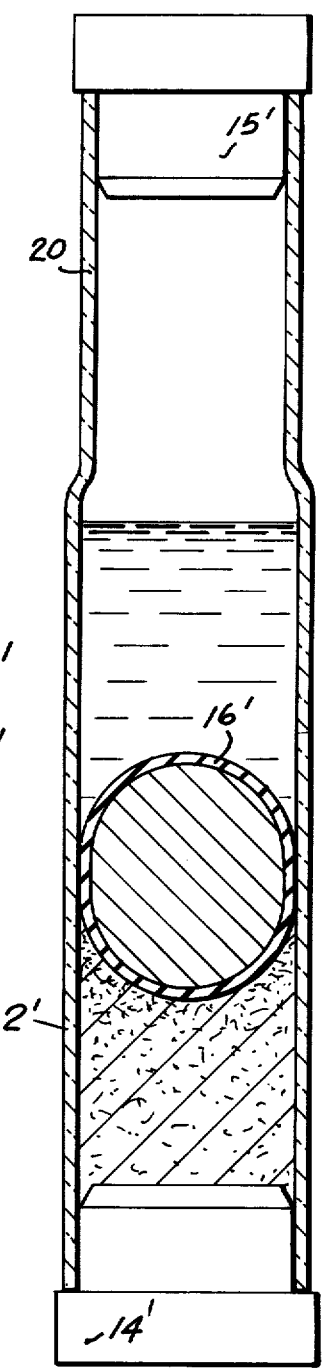

PLASMA SEPARATOR ASSEMBLY

BACKGROUND OF THE INVENTION

This invention relates generally to plasma/serum separator assemblies and particularly to a plasma/serum separator having a barrier formed of an elastomeric material and having means for retaining the barrier in a deformed condition prior to separating the collected blood by centrifugation and when centrifuging is terminated the deformable means is adapted to return to the barrier to its normal configuration to seal the barrier in the container at the plasma/serum-cellular interface.

DESCRIPTION OF THE PRIOR ART

It is known to separate blood into its component parts by centrifugation, for example, the assembly disclosed in U.S. Pat. No. 2,460,641. However, this particular assembly does not employ a means for sealing the separated plasma or serum phase from the cellular phase.

It is also known to provide assemblies for manually separating the plasma or serum phase from the cellular phase, for example, as disclosed in U.S. Pat. Nos. 3,586,064; 3,661,265; 3,355,098; 3,481,477; 3,512,940 and 3,693,804. In all of these devices the serum is collected in a blood collection container and means are provided for separating the plasma or serum phase from the cellular phase employing filter, valves, transfer tubes or the like.

It is also known to provide assemblies for the sealed separation of blood in which a piston is actuated by centrifugal force such as is disclosed in U.S. Pat. Nos. 3,508,653 and 3,779,383. These devices use either a distortable piston made of a resilient material or valve means associated with the piston to affect a sealed separation after centrifugation.

SUMMARY OF THE INVENTION

It is an object of the present invention to provide a plasma/serum separator assembly in which a barrier formed of elastomeric material has means for retaining the barrier iin a deformed condition prior to separating the blood collected in the assembly and in which said deformable means is capable of returning the barrier to its normal configuration to seal the barrier in the container at the plasma/serum-cellular interface.

It is another object of the invention to provide a barrier in a deformed condition to provide a path around the barrier to permit passage of the plasma/serum phase to pass therearound while the cellular phase passes downwardly in the collection container and the deformed barrier has means to return toward its normal configuration and thereby seal the barrier in the container at the plasma/serum-cellular interface.

It is another object of the invention to provide a serum plasma separator assembly which is economical to manufacture and can be used in conjunction with standard blood collecting equipment.

My invention generally contemplates the provision of a separator blood assembly having a blood collection container for receiving blood, the container having at least one open end which is adapted to receive a closure for sealing the end of the container. A barrier having an average specific gravity heavier than the serum/plasma or light phase of the blood but lighter than its cellular or heavy phase; the barrier outer wall being formed of an elastomeric material and having means for retaining the barrier in a deformed condition prior to separating the blood into its component phases; and said deformable means being capable of returning the barrier toward its normal configuration to seal the barrier in the container at the plasma/serum cellular interface.

DESCRIPTION OF THE DRAWINGS

For a better understanding of the invention, reference is had to the drawings which illustrate the preferred embodiments of the invention herein.

FIG. 4 is a sectional, elevational view of the assembly in which the container has a modified configuration so as to deform the barrier prior to its use and prior to the collection of blood through the cannula in the stoppered end.

FIG. 5 is a sectional, elevational view of the assembly after the blood has been centrifuged but prior to sealing of the container.

FIG. 6 is a sectional, elevational view of the assembly after the barrier has returned toward its normal configuration to seal the barrier in the container at the plasma/serum-cellular interface.

DESCRIPTION OF THE PREFERRED EMBODIMENTS

Figure 1:
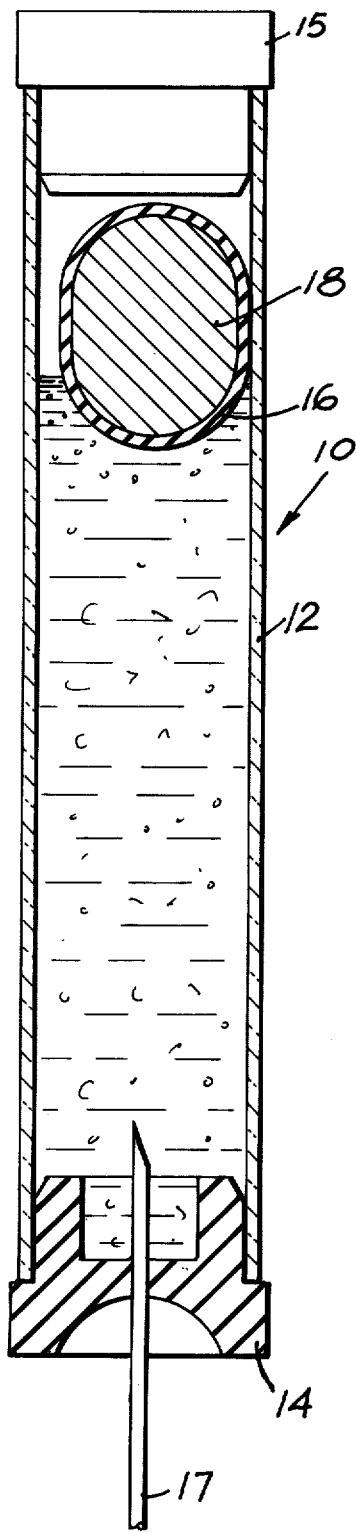
FIG. 1 is a sectional, elevational view of the plasma serum separator assembly illustrating a pointed cannula penetrating one of the stoppered ends of the container through which blood is introduced into the container prior to separation of the blood into its light and heavy phases.
Figure 2:
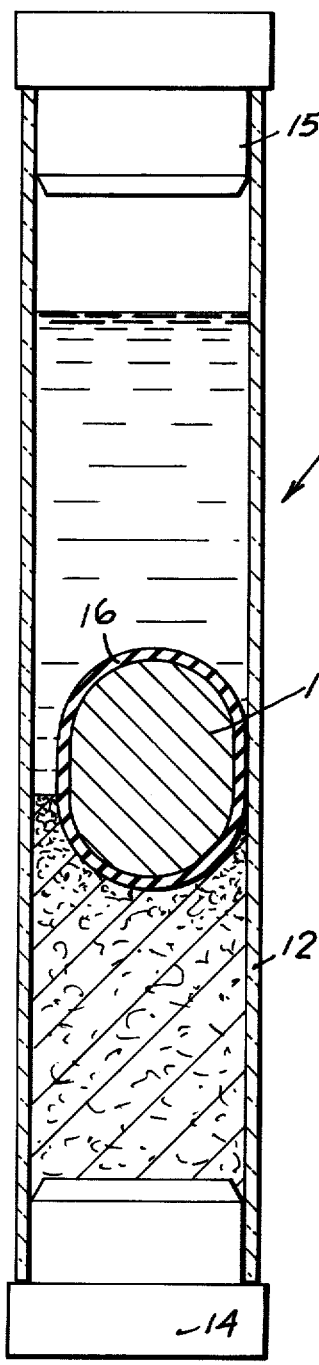
FIG. 2 is a sectional, elevational view after the cannula has been removed and the blood sample has been collected and the assembly centrifuged but prior to sealing the assembly at the plasma/serum-cellular interface.
Figure 3:
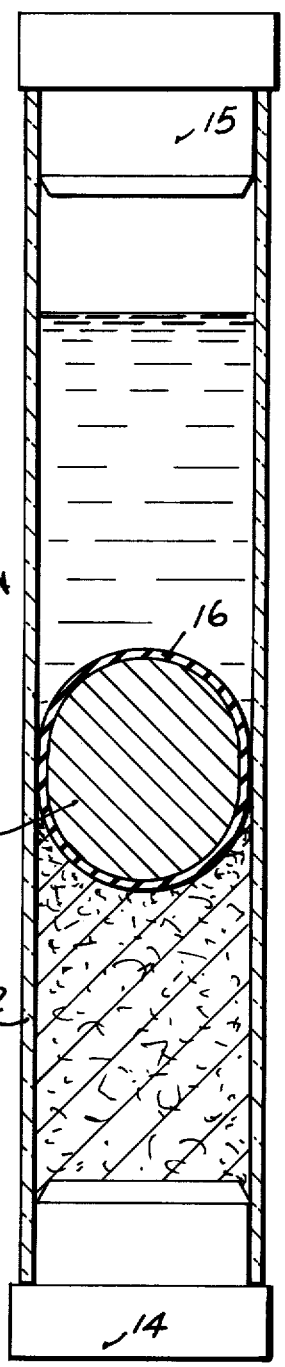
FIG. 3 is a sectional, elevational view similar to the view of FIG. 2, however, the barrier is illustrated returned to its normal configuration so as to seal the barrier in the container at the plasma/serum-cellular interface.

For a better understanding of the invention, description and drawings of the illustrative embodiments are provided here with particular reference to FIGS. 1 through 3.

In FIG. 1 separator assembly 10 comprises a tubular member or container 12 which is sealed at its open ends by closure members 14 and 15. Closure members 14 and 15 are preferably made of elastomeric material, for example, rubber which is capable of being penetrated by a cannula 17 so that blood can be transferred from a blood source into the container under aseptic conditions. The closures 14 and 15 should be self-sealing so that when the cannula is removed from closure 14 there will be no loss of blood passing through the penetration portion of closure 14, as illustrated in FIG. 1.

Disposed in container 12 is barrier 16 which is preferably made with an elastomeric outer shell dimensioned so as to normally fit in container 12 with an interference fit. The interior portion of barrier 16 is filled with a relatively low melting solid 18 which is normally solid at room temperatures, i.e.; from 65°F. to 80°F. but which readily melts at a temperature slightly in excess of blood at body temperature, i.e.; above 98.6°F. Such a meltable solid material 18 may be a wax or other suitable and preferred material either natural or synthetic, which has a melting point above normal room temperature and which will not melt when the blood sample is drawn. When forming barrier 16 for use with the assembly 10 as illustrated in FIG. 1 of the invention herein the barrier is heated so that the wax inside it will melt and the barrier is thereafter placed in a tube having a diameter slightly less than the internal diameter of container 12 and the was is cooled and solidified while the barrier is in this tube. Thereafter, when barrier 16 is inserted into assembly 10 the barrier will be loose and will readily slide to either end of the container 12. Further, the barrier is formed having an average specific gravity heavier than the light phase of blood but lighter than its cellular or heavy phase.

When container 12 is filled with whole blood its specific gravity is substantially the average of its components 1.06. The specific gravity of the light phase is about 1.03 and the heavy phase about 1.09. Since the barrier is deformed its location in the container prior to centrifugation is random and only during centrifugation will it seek and move to the interface as seen in FIG. 2.

When the assembly is centrifuged after cannula 17 is removed as illustrated in FIG. 2, barrier 16 will move to the plasma/serum cellular interface. However, barrier 16 remains deformed and does not form a liquid tight seal. The contents of container 12, that is, the heavy phase, can be mixed with the light phase by simply inverting or shaking the assembly 10. In order to seal the barrier in the container so as to effect a liquid tight sealed separation, the centrifuged assembly as illustrated in FIG. 2 is placed in a thermal environment slightly above the melting point of the wax so that barrier 16 will try to return to its normal spherical shape with portions of the sphere pressing against the interior surfaces of container 12 thereby effecting a liquid tight sealed separation after the wax has resolidified.

The embodiment illustrated in FIGS. 4 through 6 functions in the identical manner as described in the embodiment illustrated in FIGS. 1 through 3. However, the deformation of barrier 16' is accomplished by providing a tubular member 12' having a reduced diameter portion 20 formed at one end thereof so that barrier 16' can be deformed in tubular member 12' and remain in position without movement throughout the container prior to its use as illustrated in FIG. 4. Closures 14' and 15' are made of the material described in connection with FIG. 1. Cannula 17' penetrates stopper 14' to fill the container with blood from a suitable blood source. The barrier 16' will remain in a reduced diameter portion 20 until the assembly 10' is centrifuged. Barrier 16' will then slide downwardly through the reduced diameter portion 20 and into the container 12' and pass through the plasma/serum phase and come to rest at the plasma/serum-cellular interface as illustrated in FIG. 5. Thereafter, the assembly 10' is heated as described above so that barrier 16' will try to return to its normal spherical configuration and provide an interface fit to seal the plasma/serum phase from the cellular phase as illustrated in FIG. 6.

When operating the separator assembly as set forth in the preferred embodiments, the blood collection tube 12 which is fitted with end closures 14 and 15 is preferably evacuated so that when cannula 17 penetrates closure 14 blood will automatically fill container 12. It is also contemplated that the design of separator assembly 10 of the invention herein should be suitable for use with blood collecting assemblies described in U.S. Pat. Nos. 2,460,641; 3,469,572 and 3,494,352.

After the blood has been collected in container 12 the assembly 10 is then ready for centrifuging. After the assembly with the blood sample is centrifuged, the barrier will float between the plasma/serum and cellular interface since, as described above, the barrier has a specific gravity heavier than the plasma or serum phase but lighter than the cellular phase. Thereafter, assembly 10 is heated, for example, by placing in a constant temperature water bath maintained at a temperature slightly above the melting point of the meltable material so that the deformed barrier will return toward its natural configuration with the resilient outer portion forming a sealing interference fit with the inner walls of the container 12. After the assembly 10 is removed from the water bath the melted material will resolidify and the elastomeric outer shell 16 will thereby form a seal so that the serum/plasma phase is separated from the cellular or heavy phase. Thus, a plasma serum separator assembly has been described in which blood can be collected, centrifuged, separated into its component phases, shipped through the mails for further analytical determinations without the plasma or serum mixing with the cellular phase even though the assembly is inverted and handled roughly.

While variations of the invention herein may be had, the objectives of the invention have been illustrated and described and it is contemplated that changes in design can be made without departing from the spirit of the invention described herein.

What is claimed is:

1. A method for separating blood into its light phase of serum or plasma and its heavy cellular phase, which comprises;

A. Providing an assembly which comprises;
  a container having at least one open end which is adapted to receive blood for subsequent separation into a light phase and a heavy phase;
  a closure sealing the open end of the container, the closure being formed of a self-sealing, elastomeric material which is penetrable by a cannula through which blood to be separated may be conducted into the container;
  a barrier member within said container, said barrier member being formed of an outer shell of elastomeric material which encloses a meltable mass of material which is normally solid at room temperatures and which has a melting point slightly above 98.6°F. said barrier member and said meltable mass together having a specific gravity heavier than the light phase of blood but lighter than the cellular heavy phase, said barrier member having a normal dimension and configuration when said mass is above its melting point so as to form a liquid-tight seal with the inner walls of said container, thereby dividing said container into upper and lower sealed chambers; said barrier member having a deformed dimension and configuration when said barrier is deformed while said mass is above its melting point, and then allowed to resolidify by cooling below its melting point, said barrier member being placed in said container in a deformed configuration prior to separating the blood collected in the assembly whereby in said deformed configuration said seal is not established and said container defines a single chamber;

B. introducing blood into the assembly through the self-sealing, elastomeric closure;

C. subjecting the blood containing assembly to centrifugal force whereby the heavy cellular phase moves downwardly in the container and the barrier member moves to and stops at the light phase-heavy cellular phase interface; and D. heating the meltable mass to a temperature above 98.6°F to return the deformed barrier toward its normal configuration so that the member forms a liquid-tight seal between the outer surfaces of the barrier member and the inner wall of the container thereby effecting a sealed separation of the light phase and the heavy cellular phase of the blood and E. Then resolidifying said meltable mass by cooling below 98.6°F.

2. A separator assembly capable of separating blood into a plasma/serum or light phase and a cellular or heavy phase comprising:

a container having at least one open end which is adapted to receive blood for subsequent separation into a light phase and a heavy phase;

a closure sealing the open end of the container, the closure being formed of a self-sealing, elastomeric material which is penetrable by a cannula through which blood to be separated may be conducted into the container;

a barrier member within said container, said barrier member being formed of an elastomeric material and having a normal dimension and configuration so as to form a seal with the inner walls of said container, thereby dividing said container into upper and lower sealed chambers; said barrier member having associated therewith means for retaining the barrier member in a deformed configuration prior to separating the blood collected in the assembly whereby in said deformed configuration said seal is not established and said container defines a single chamber; and said means being capable of returning the barrier member to its normal configuration in the container; and wherein the barrier member comprises an outer shell of elastomeric material which encloses said means and said means comprises a mass of material which is normally solid at room temperatures and which has a melting point slightly above 98.6°F; and said barrier member and said means together having a specific gravity heavier than the light phase of blood but lighter than the cellular heavy phase.

3. The assembly of claim 2 wherein the container is a tube having a uniform diameter.

4. The assembly of claim 2 wherein the container is formed having one end of reduced diameter which is adapted to receive the barrier member in a sliding, sealing fit while said barrier member is in the deformed configuration.

5. A separator assembly capable of separating blood into a plasma/serum or light phase and a cellular or heavy phase comprising:

a container having at least one open end which is adapted to receive blood for subsequent separation into a light phase and a heavy phase;

a closure sealing the open end of the container, the closure being formed of a self-sealing, elastomeric material which is penetrable by a cannula through which blood to be separated may be conducted into the container;

a barrier member within said container, said barrier member being formed of an elastomeric material and having a normal dimension and configuration so as to form a seal with the inner walls of said container, thereby dividing said container into upper and lower sealed chambers; said barrier member having associated therewith means for retaining the barrier member in a deformed configuration prior to separating the blood collected in the assembly whereby in said deformed configuration said seal is not established and said container defines a single chamber; and said means being capable of returning the barrier member to its normal configuration in the container; and wherein the means is a wax having a melting point slightly above 98.6°F and is enclosed in said elastomeric barrier material; and said barrier member and said means together having a specific gravity heavier than the light phase of blood but lighter than the cellular heavy phase.

* * * * *